United States Patent Office 3,567,781
Patented Mar. 2, 1971

3,567,781
PROCESS FOR THE PREPARATION OF POLY
AROMATIC ETHERS AND THIOETHERS
Frank S. Clark, St. Louis, Mo., assignor to Monsanto
Company, St. Louis, Mo.
No Drawing. Filed Apr. 24, 1967, Ser. No. 632,920
Int. Cl. C07c *149/32, 41/04*
U.S. Cl. 260—609
14 Claims

ABSTRACT OF THE DISCLOSURE

A process for the preparation of a group of compounds representative of which are polyphenyl ethers, mixed polyphenyl ether-thioethers, phenoxybiphenyls and phenoxyphenylmercaptobiphenyls comprising the steps of interacting an aromatic iodo, bromo or chloro compound with an alkali metal salt of an aromatic hydroxy compound in the presence of certain dipolar aprotic solvents representative of which are sec- and tert-amides, phosphorus amides and sulfones. The above compounds have many uses, among which are use as hydraulic fluids and jet engine lubricants.

---

This invention relates to a novel process for the preparation of oxygen-containing compounds which comprises the inter-action of a reactive halo organic compound with an alkali metal compound in the presence of certain dipolar aprotic solvents.

One of the classical reactions that the prior art discloses is the Ullmann reaction whereby a copper catalyst is used to catalyze the reaction between a metal salt of a hydroxy compound such as phenol and an iodo-, chloro- or bromo-containing compound. In general, in order to increase yields, it is preferred that the iodo, chloro or bromo atom be activated by some other group, such as a nitro group, which is either ortho or para to the halogen. The presence of the activating group activates the halogen towards attack by the displacing agent such as a phenate ion.

As has been stated above, the typical Ullmann reaction utilizes a catalyst such as copper or a copper salt and is in general carried out as a melt or in an inert solvent. The Ullmann reaction has been found to be extremely temperature dependent, that is, as the temperature is increased yields of a product prepared by the Ullmann process decrease. Thus, greater yields are obtained utilizing the Ullmann reaction at temperatures of about 160° C. or lower. As the temperature is increased above 180° C., the yields of products prepared by the Ullmann process decrease at a considerable rate. Thus, it has been found that above temperatures of about 190° C. decomposition of alkali metal salts of hydroxy aromatic compounds can occur with subsequent loss of any yield of product. In addition, the presence of a copper catalyst can promote reductive dehalogenation of a halogen-containing reactant, especially at the higher temperatures. In addition, as decomposition and dehalogenation occur, resins and tars can be formed which can deactivate the catalysts as well as reducing the yield of a given product. In addition, it has been found that the Ullmann reaction in general is not applicable when dihydroxy aromatic compounds are utilized as starting reactants. Thus, a compound such as resorcinol does not significantly interact with an iodo-, chloro- or bromo-containing compound utilizing the Ullmann reaction in an inert solvent.

Whereas the Ullmann reaction has been applicable to the preparation of unsubstituted polyphenyl ethers, the Ullman reaction in the absence of an activating group, such as nitro, has been found not to be generally applicable to the preparation of unsubstituted polyphenyl thioethers. Thus, in order to effect displacement of a halogen by a thiophenate ion, lead thiophenolate has to be used, and even then the process is not applicable to displacement reactions when aryl chlorides are utilized. As is seen from the foregoing, there is, in general, no way of predicting if a process will be applicable to both the preparation of a polyphenyl thioether as well as a polyphenyl ether. Thus, the Ullmann reaction can be utilized for the preparation of unsubstituted polyphenyl ethers whereas the Ullmann reaction is not applicable to the preparation of polyphenyl thioethers.

One of the major problems arising through the use of a catalyst is that copper can catalyze, in addition to the reaction that is intended, side reactions. Thus, for example, cyclic amide solvents are cleaved and can react with the remaining solvent as well as the starting reactants when copper is utilized as a catalyst. In particular, cyclic amides such as N-methyl-pyrrolidone and pyrrolidone can cleave in the persence of copper. As is apparent from the foregoing, the use of such solvents can inject many problems, among which are the reaction of the solvent itself as well as deactivation of a catalyst through the formation of tars and resins.

The problems that arise following the teachings of the prior art methods are in general (a) contaminated products, (b) side reactions and (c) the necessity of using activated groups to activate the halogen. One of the major problems that arises from using a metal catalyst such as copper is that retention of certain copper salts in a given product can adversely affect the usefulness of such product. For example, polyphenyl ethers have utility as lubricants for jet engines and as such the performance of a polyphenyl ether is dependent on its rate of oxidation. Thus, the useful life of a polyphenyl ether lubricant is decreased considerably as the rate of oxidation of the fluid increases. This is particularly pronounced at temperatures above 500° F. and even more pronounced as the temperatures go above 600° F. Thus, if one were to prepare a polyphenyl ether utilizing the Ullmann reaction, additional process steps have to be utilized in order that these salts are not present in the polyphenyl ether since certain copper salts at given concentrations in a polyphenyl ether have been shown to promote the rate of oxidation of a polyphenyl ether.

In addition to the above effect on product quality, side reactions are especially pronounced when a catalyst is used since a catalyst can catalyze many reactions in addition to the intended reaction which is attempted to be carried out. Thus, a catalyst and the numerous number of side reaction products which are produced as a result of the employment of a catalyst have to be removed from the final product, thereby necessitating additional and difficult process steps. The formation of a numerous number of side reaction products adversely affects the yields of the intended product and necessitates removal of large amounts of contaminated products.

The difficulty that arises with respect to the use of activating groups to activate an iodo, bromo or chloro atom is that compounds can only be prepared which contain this activating group. Thus, an entire spectrum of unsubstituted compounds cannot be prepared due to the fact that the starting materials do not contain an activating group. In addition, especially in the presence of a catalyst, as for example, copper or copper salts, the use of an activating group provides an additional reactive site which can interact to produce additional side reactions thereby nullifying the ability to prepare a single given product in good yield.

It has now been found that oxygen-containing compounds can be prepared in good yields in the absence of copper catalysts by the interaction at high temperatures of (A) a halo compound represented by the structure

wherein R is aryl, Hal is a reactive halogen selected from the group consisting of iodine, chlorine and bromine and $n$ is a whole number having a value of at least 1, with (B) an alkali metal compound represented by the formula

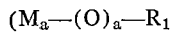

wherein M is an alkali metal, $R_1$ is aryl and $a$ is a whole number having a value of at least 1, in the presence of (C) a dipolar aprotic solvent characterized by the presence therein of at least one group represented by the structure

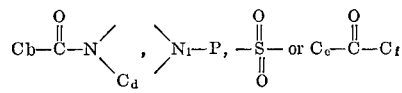

wherein P is a phosphorus-containing residue, $C_b$, $C_e$ and $C_f$ are carbon atoms, $C_d$ is a non-aromatic carbon atom, $N_1$ is a nitrogen atom, provided that at least one of the phosphorus atoms in the phosphorus-containing residue is attached to $N_1$ and further provided that there is not more than one hydrogen atom attached to $N_1$.

In carrying out the process of this invention, the halo compound represented by (A), the alkali metal compound represented by (B) and the solvent represented by (C) can be added in indifferent order, there being no criticality existing as to the order of addition of (A), (B) or (C). It is, however, a critical aspect of this invention that the temperature that is utilized in carrying out the process of this invention be at least about 190° C., preferably above about 225° C. It has been found that below 190° C. no significant interaction of a compound represented by (A) and (B) in the presence of (C) occurs. Above 190° C. and particularly at temperature above 225° C., interaction of (A) and (B) occurs in good yields. The temperature dependence of the process of this invention has been found to be completely contrary to the teachings of the classical Ullmann reaction and as such is a critical aspect of this invention. In general there is no upper limit as to temperature other than substantial decomposition of the reactants represented by (A) and (B), and in general, temperatures up to about 350° C. can be utilized in carrying out the process of this invention. The temperature, herein defined to include either a constant temperature or a variable temperature or both, is maintained for a time sufficient to effect interaction of (A) and (B) in solvent (C). The process can be carried out at atmospheric pressure, or a pressure above or below atmospheric pressure can be utilized depending on the particular reactants and the solvent utilized. The time during which the reaction is carried out can vary over a wide range and is dependent on the particular starting reactants represented by (A) and (B) and such time that is used is that time which will prepare the desired product.

Since the carrying out of the process involves the utilization of a solvent (C), the solvent is generally removed from the product prepared by the interaction of (A) and (B). However, in some cases, depending on, for example, the physical properties of the solvent, it may be advantageous to use the final process mixture, that is, the reaction product of (A) and (B) and the dipolar aprotic solvent (C) as a fluid composition. Thus, the solvent itself can provide some additional property in combination with the product of (A) and (B), thereby producing a fluid composition which has a particular utility such as a heat transfer fluid. In addition, the solvent can be partially or totally removed depending on the purity of the product desired and the final intended use for the product. Thus, for example, when a phosphoroamidate such as N-methyl-N-butyl - N′ - methyl - N′ - butyl-N″-methyl-N″-butyl-phosphorotriamidate is used as a dipolar aprotic solvent, such phosphoroamidate itself may be a blending agent for the compound produced by reacting (A) and (B) such as when a 3- to 5-ring polyphenyl ether is produced by the process of this invention and such blend of dipolar aprotic solvent and product can have utility, for example, as a hydraulic fluid or heat transfer fluid.

With respect to alkali metal compound (B), which is utilized in the process of this invention, such metal compound can be added to the process system or in the alternative can be prepared in situ in the process system. Thus, for example, alkali metal compound (B) can be prepared in the solvent (C) by mixing, for example, an alkali metal hydroxide with a phenol compound to produce an alkali metal phenate.

Typical examples of M are lithium, sodium, potassium and rubidium. It is preferred, however, to use sodium or potassium.

The halo compound represented by (A) is a compound which contains at least one reactive halo atom selected from chloro, bromo or iodo or combinations thereof. The term "reactive halo atom" is used to designate that halo atom which enters into the reaction in carrying out the process of this invention. Thus, less than the total number of halo atoms which are present in a given molecule can interact with (B) to produce a given product. In addition R includes aryl groups which contain, in addition to hydrogen and carbon, elements such as halogen, that is, iodo, bromo and chloro when iodo, bromo and chloro are not a reactive halo atom. Whereas all the above reactive halo atoms are contemplated within the scope of this invention, the preferred reactive halo atoms are bromo and chloro.

The groups represented by R and $R_1$ can be aryl, aryl herein defined to include mono-, di- and polynuclear aromatic groups such as phenyl, naphthyl, biphenylyl and anthryl, and in addition are herein defined to include aryl groups which are unsubstituted as well as substituted. Typical examples of substituents which can be attached to the aforedescribed groups are halogen, aryloxy, aryl, alkaryl, aralkyl, alkoxy, alkyl, polyaryloxy, haloaryl, arylmercapto, polyarylmercapto, haloarylmercapto, halopolyarylmercapto, hydroxyl, haloalkyl, haloaryloxy, halopolyaryloxy and the like. Thus, other elements can be present other than carbon and hydrogen as, for example, oxygen, nitrogen, sulfur and halogen, which elements in turn can form all or part of a group which is substituted upon an aryl group or which links two or more aryl groups. Generally, a substituted aryl group represented by R and $R_1$ will contain as an upper limit of up to about 15 elements per reactive halo atom represented by Hal or per alkali metal atom represented by M and still more generally up to about 7 elements per reactive halo atom represented by Hal or per alkali metal atom represented by M. The aryl groups represented by R and $R_1$ can be defined by the number of carbon atoms present per reactive halo atom or per alkali metal atom represented by M based upon the yield of product obtained after a given time. Thus, the lower molecular weight reactants represented by (A) and (B) in general give better conversions than the corresponding higher molecular weight reactants represented by (A) and (B).

The process of this invention is particularly applicable to a process whereby the aryl group represented by R and $R_1$ contains as an upper limit of the number of carbon atoms per reactive halo atom represented by Hal or per alkali metal atom represented by M of up to about 48 carbon atoms and even more applicable when the aryl group contains up to about 30 carbon atoms per reactive halo atom represented by Hal or per alkali metal atom represented by M.

Whereas the process in general is most applicable to reactants represented by (A) and (B) wherein the aryl group is as aforedescribed, the process of this invention includes processes whereby the starting reactant (A) or (B) contains a number of carbon atoms and elements which are in excess of those described above.

Thus, depending on the product which is sought to be obtained, a compound represented by (A) or (B) can contain a number of carbon atoms and elements in considerable excess of the above limit. As an example of a reactant represented by (A) or (B) containing a considerable number of carbon atoms in excess of the preferred upper limit is a polymer obtained by the polymerization of, for example, m-dichlorobenzene with potassium resorcinate. Thus, a polymer can be produced which has one or more terminal chloro atoms or one or more terminal hydroxy groups or both which polymer has a number of carbon atoms in considerable excess of the preferred upper limit. This polymer in turn can be further interacted to prepare an even higher molecular weight compound. The process of this invention contemplates that materials having a number of carbon atoms in excess of the preferred upper limit can be further interacted and such interaction in the presence of (C) is included within the process of this invention.

Typical examples of R and $R_1$ are phenyl, mono- and polychlorophenyl, mono- and polybromophenyl, biphenylyl, biphenylylene, xylyl, xylylene, mesityl, ethylphenyl, ethylphenylene, n-propylphenyl, n-butylphenyl, tert-butylphenylene, amylphenyl, diisopropylphenyl, caprylphenylene, octylphenyl, nonylphenyl, decylphenyl, laurylphenyl, laurylphenylene, tridecylphenyl, hexadecylphenyl, stearylphenyl, wax phenyl, methylphenylene, hydroxyphenylene, hydroxyphenyl, methylhydroxyphenyl, methylhydroxyphenylene, butoxyphenyl, lauroxyphenyl, lauroxyphenylene, methylmethoxyphenyl, ethylmethoxyphenyl, ethylchlorophenyl, isopropylchlorophenylene, phenylmercaptophenyl, phenanthryl, anthryl, methylisopropylphenanthryl, chloronaphthyl, m-trifluoromethylphenyl, o-, m- and p-2,2,2-trifluoroethylphenyl, o-, m- and p-3,3,3-trifluoropropylphenyl, o-, m- and p-4,4,4-trifluorobutylphenyl, alkylhydroxyphenyl, alkylchlorophenyl, alkylcyanophenyl, butylcyano naphthyl, cyclohexylphenyl, tert-butylphenoxyphenyl, aminophenyl, o-, m- and p-phenoxyphenyl, o-, m- and p-(o-, m- and p-phenoxyphenoxy)phenyl and the like.

Typical examples of aromatic compounds represented by (A) which are useful in the process of this invention are aromatic halides and combinations thereof, such as mono- and dihalonaphthalenes, mono- and dihalobenzophenones, halobenzene, o-, m- and p-dichlorobenzene, o-, m- and p-dibromobenzene, 1-chloro-3-bromobenzene, 1-chloro - 4 - bromobenzene, 1,3,5 - trichlorobenzene, 1,3,5 - tribromobenzene, 1 - bromo - 2,3 - dichlorobenzene, 1 - bromo - 2,4 - dichlorobenzene, and the like; sulfides such as 1 - chloro - 4 - phenylmercaptobenzene, 1 - chloro - 3-phenylmercaptobenzene, 1-bromo-4-phenylmercaptobenzene, 1 - chloro - 2 - phenylmercapto-4-chlorobenzene, 1 - bromo - 2-phenylmercapto-4-bromobenzene, 1 - chlorophenylmercapto-4-bromobenzene, 1,2-dichloro - 3 - phenylmercaptobenzene, 1,2-dibromo-3-phenylmercaptobenzene, 1,3,5 - trichloro - 2 - (3,5-dichlorophenylmercapto)-4-chlorobenzene, 2,4 - dibromo-3-(2,4 - dibromophenylmercapto) - 1 - bromobenzene, 1-chloro - 2 - phenylmercapto-3-chlorobenzene, 3-phenylmercapto - 3' - (m-chlorophenylmercapto)diphenyl sulfide, 1 - bromo- 2 - (3-bromophenylmercapto)-4-bromobenzene, 1 - chloro- 2 - (3 - chlorophenylmercapto)-4-chlorobenzene, 1 - phenylmercapto - 3 - (m-bromophenylmercapto)benzene; ethers such as 4-chlorodiphenyl ether, 2 - chlorodiphenyl ether, 3 - chlorodiphenyl ether, 3-(p-chlorophenoxy)diphenyl ether, 3 - (o-bromophenoxy)diphenyl ether, 3 - (m-chlorophenoxy)diphenyl ether, 3-phenoxy - 3' - (m - chlorophenoxy)diphenyl ether, 3-chloro-3'-(p-chlorophenoxy)diphenyl ether, 4-(o-chlorophenoxy)diphenyl ether, 1 - chloro-2-phenoxyphenoxy-4-chlorobenzene, 1 - bromo-3-phenoxyphenyl-2-chlorobenzene, 1 - chloro - 2-phenoxyphenyl-3-chlorobenzene, 1,2-dichloro-3 - phenoxyphenylbenzene, 1,2 - dibromo-4-(m-phenoxyphenyl)benzene, 1,3,5 - trichloro-2-(m-3,5-dichlorophenoxyphenyl) - 4 - chlorobenzene, 2,4-dibromo-3 - (m - 2,4-dibromophenoxyphenyl)-1-bromobenzene, 1-bromo-2-(m-phenoxyphenyl)-3-bromobenzene, 1-bromo-2 - (m - 3-bromophenoxyphenyl)-4-bromobenzene and 1-chloro-2-(m-3-chlorophenoxyphenyl)-4-chlorobenzene.

Typical examples of metal compounds represented by (B) are metal phenate, metal resorcinate, metal o-, m- and p-phenoxyphenate, metal o-, m- and p-(m-chlorophenoxy)phenate and metal m-(m-phenoxyphenoxy) phenate. In addition, it is contemplated within the scope of this invention that metal compounds represented by (B) can be prepared from the aforedescribed examples of aromatic compounds represented by (A) by replacement of one or more chloro and/or bromo atoms with a hydroxyl group. Such aromatic compounds when replaced by a hydroxyl group can be utilized as reactant (B) when carrying out the process of this invention and are included within the scope of this invention.

Typical examples of unsubstituted and substituted hydroxy aromatic compounds from which the alkali metal compounds represented by (B) can be derived are phenol, o-, m- and p-cresol, cyanophenol, guaiacol, saligenin, thymol, o-, m- and p-hydroxy acetophenone, o-, m- and p-hydroxydiphenyl, o-, m- and p-cyclohexyl phenol, catechol, resorcinol, pyrogallol, o-, m- and p-aminophenol, α- and β-naphthol, 8-octyl-β-naphthol, 6-dodecyl-α-naphthol, 3,4-dimethyl-5-hexylphenol, n-decylphenol, acetophenol, nonylphenol, alkaryl-substituted phenols, hydroquinone, alkyl resorcinol, octyl catechol, 2,6-di-sec-butyl-p-aminophenol, 4-N,N-dibutylaminomethyl-2,6-di-sec-butylphenol, o-, m- and p-phenoxyphenols and o-, m- and p-[(o-, m- and p-phenoxyphenoxy)]phenols.

The dipolar aprotic solvent represented by (C) is defined as a solvent that does not readily accept or donate a proton when being utilized as a solvent in the process of this invention under the particular process conditions which are utilized in carrying out the process of this invention. Thus, for example, time, temperature, pressure and mole ratio of reactants can be adjusted to limit the accepting or donating of a proton by the solvent molecule. In addition, the dipolar aprotic solvent can contain substituents attached thereto in an amount such that the substituents do not completely nullify the effectiveness of the dipolar aprotic solvent. It is contemplated within the scope of this invention that more than one compound which is characterized by the presence of the above dipolar groups can be blended together to form a dipolar aprotic solvent. In addition, a compound can contain more than one of the characterizing groups within the same compound and such compounds are included within the term dipolar aprotic solvent represented by (C).

Whereas many compounds and mixtures of compounds can be utilized having incorporated therein the characterizing groups as set forth above, such characterizing group should be present in relation to the substituents attached to the characterizing group such that the effect of the characterizing group would not be comparable to an inert solvent. The dipolar aprotic solvent can be represented by the number of carbon atoms present in the total number of groups attached to the characterizing group based upon the practical problem of obtaining a solvent effect at concentrations such as to adequately promote the reaction of (A) with (B). Thus, it is preferred to have as an upper limit of the number of carbon atoms in the attached groups per characterizing group of up to about 48 carbon atoms per characterizing group and more particular up to about 12 carbon atoms per characterizing group. In general, it is preferred to have a non-aromatic carbon atom attached to the characterizing group and still more preferred to have alkyl groups attached to the characterizing group. Thus, for example, alkyl groups having from 1 to 12 carbon atoms are particularly preferred as substituents attached to the characterizing groups.

Typical examples of a solvent characterized by the presence of at least one

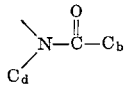

group are amides, such as tertiary and secondary amides, examples of which are dimethylacetamide, diethylacetamide, dimethylpropionamide, dimethylbutyramide, diisopropylacetamide, dimethylcaproamide, dimethyllauramide, dimethylpalmitamide, dimethylstearamide, dicyclohexylformamide, dicyclohexylacetamide, methylethylacetamide, methyloctadecylacetamide and the like; cyclic amides such as caprolactam, N-methyl-4-methyl-2-pyrrolidone, N-methyl-3,4-diethylpyrrolidone, N-methyl-2-pyrrolidone, N-ethyl-2-pyrrolidone, N-propyl-2-pyrrolidone, N - octyl - 2 - pyrrolidone, N - octadecyl - 2 - pyrrolidone, N-methyl-2-piperidone, N-methylphthalimidine, pyrrolidone, methylacetamide, cyclohexylacetamide, methylstearamide, methylpalmitamide, methyllauramide, methylcaproamide, isopropylacetamide, N-methylbutyramide, methylpropionamide, ethylidene-bis-3-(2-pyrrolidone) and the like.

Typical examples of dipolar aprotic solvents which are characterized by the presence of at least one $>N_1$—P group within the solvent are amides of an acid of phosphorus, which amides can be derived from phosphorus acids such as phosphonic and phosphinic acids, phosphoric acid, phosphorus acid and phosphonous acids. Typical examples of amides of an acid of phosporus are P,P-dimethyl-N-N-dimethylphosphinic amide, pentamethylphosphonic diamide, P - ethyl - N,N,N',N'-tetramethylphosphonic diamide, N,N'-tetramethyl-p-phenyl phosphonous amide, p-butyl - N,N,N',N' - tetramethyl phosphonic amide, tetramethylphosphorus diamide, P-methyl-N,N,N',N' - tetraethylphosphonic amide, P,P-diethyl-N,N - dimethylphosphonic amide, N,N' - tetramethyl-P-ethylphosphonous amide, phenyl-methyl-N,N-dimethylphosphoroamidate, phenylmethyl - N,N - di-n-butylphosphoroamidate; mixtures of phenyl-m-cresyl-N,N-dimethylphosphoroamidate and phenyl-p-cresyl-N,N-dimethylphosphoroamidate; mixtures of m-cresyl-p-cresyl-N,N-dimethylphosphoroamidate, di-m-cresyl - N,N - dimethylphosphoroamidate and di-p-cresyl-N,N-dimethylphosphoroamidate; di-m-bromophenyl-N-methyl-N-n-butyl phosphoroamidate, phenyl-N,N-di-n-butyl - N',N' - di-n-butylphosphorodiamidate, phenyl-N,N-dimethyl - N',N' - dimethylphosphorodiamidate, m-bromophenyl - N - methyl-N-n-butyl - N' - methyl-N'-n-butylphosphorodiamidate, p-bromophenyl - N - methyl-N-isobutyl-N'-methyl-N'-isoamylphosphorodiamidate, N-methyl-N-butyl - N' - methyl-N'-butyl-N''-methyl - N'' - butylphosphorotriamidate, N-methyl - N - butyl-N',N''-tetramethylphosphorotriamidate, N-di-n-propyl - N',N'' - tetramethylphosphorotriamidate, N,N'-tetra - n - propyl-N''-dimethylphosphorotriamidate and N,N',N''-hexamethylphosphorotriamidate.

Additional dipolar aprotic solvents which are characterized by

are sulfones, such as diethyl sulfone, diphenyl sulfone, hexylphenyl sulfone, 1-naphthylphenyl sulfone and tetrahydro-1,1-dioxy thiophene.

Typical examples of dipolar aprotic solvents which are characterized by the presence of

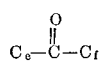

are ketones, examples of which are acetophenone, propionphenone, butyrophenone, pelargonophenone, capriphenone, hendecanophenone, acetonaphthone, capronaphthone, arachidophenone, stearonaphthone, benzoin, methyl-2-naphthyl ketone, benzophenone, 4,4'-bis(dimethylamino)benzophenone, 4-methylbenzophenone, 4,4'-dimethylbenzophenone, 2-, 3- and 4-dimethylaminobenzophenone, 4,4'-dicyanobenzophenone, 1-naphthyl ketone, 4-methyl-1-naphthyl 1-naphthyl ketone, 4-methoxy-1-naphthyl 1-naphthyl ketone, 4-dimethylamino-1-naphthyl 1-naphthyl ketone, 1-naphthylphenyl ketone, furfuryl ketone, methyl furfuryl ketone, phenylfurfuryl ketone, 1-naphthyl furfuryl ketone.

In addition, the proces of this invention can be carried out in the presence of the dipolar aprotic solvent represented by (C) and an additional solvent or diluent which is not classified within the scope of solvent (C). Thus, it is contemplated within the scope of this invention that other solvents such as aromatic or aliphatic solvents can be utilized together with a solvent represented by (C) in a concentration such that it does not completely nullify the effectiveness of the dipolar aprotic solvent.

Utilizing the process of this invention, oxygen-containing compounds can be prepared. Typical examples of compounds which can be prepared are polyphenyl ethers, mixed polyphenyl ether-thioethers, phenoxybiphenyls and mixed phenoxyphenylmercaptobiphenyls. Such compounds and mixtures of compounds have been found to have many applications especially as functional fluids. Functional fluids have been used as electronic coolants, atomic reactor coolants, diffusion pump fluids, lubricants, damping fluids, bases for greases, power transmission and hydraulic fluids, heat transfer fluids, heat pump fluids, refrigeration equipment fluids and as filter mediums for air conditioning systems. Because of the wide variety of applications and the varied conditions under which functional fluids are utilized, the properties desired in a good functional fluid necessarily vary with the particular application in which it is to be utilized with each individual application requiring a functonal fluid having a specific class of properties. Of the foregoing, the use of functional fluids as hydraulic fluids, particularly aircraft hydraulic fluids, jet engine lubricants and heat transfer fluids, has posed what is probably the most difficult area of application. Thus, a functional fluid must be as highly non-flammable as possible and must be sufficiently non-flammable to satisfy aircraft requirements for fire resistance.

A few examples of compounds and mixtures of compounds which can be prepared utilizing the process of this invention can be represented by the following structure

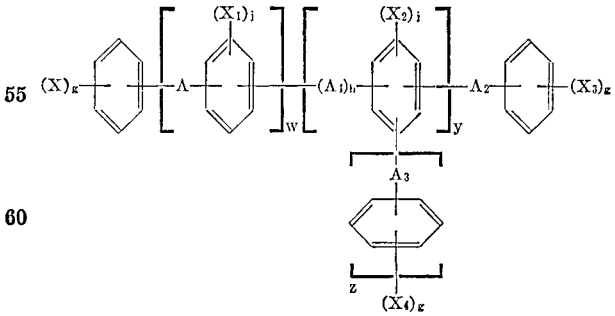

wherein A, $A_1$, $A_2$ and $A_3$ are each a chalkogen having an atomic number of 8 to 16 wherein at least one of the chalkogens represented by A, $A_1$, $A_2$ and $A_3$ is oxygen; X, $X_1$, $X_2$, $X_3$ and $X_4$ each can be for example, hydrogen, alkyl, haloalkyl, halogen, phenyl, alkaryl, hydroxy, alkoxy, aralkyl and substituted aralkyl; $w$, $y$ and $z$ are whole numbers each having a value of 0 to 8; $j$ is a whole number having a value of from 1 to 4; $g$ is a whole number having a value of from 1 to 5 and $h$ is a whole number having a value of 0 to 1 provided that when $h$ is 0, $y$ can have a value of 1 to 2. Typical examples of such compounds are 2- to 7-ring o-, m- and p-polyphenyl ethers and mixtures thereof, mixed polyphenyl ether-thioether compounds, phenoxybiphenyls, mixed phenoxyphenylmercaptobiphenyls and mixtures thereof.

Typical examples of unsubstituted polyphenyl ethers are the bis(phenoxyyphenyl) ethers, e.g., bis(m - phenoxyphenyl) ether; the bis(phenoxyphenoxy)benzenes, e.g., m-bis(m - phenoxyphenoxy)benzene, m - bis(p - phenoxyphenoxy)benzene, o - bis(o - phenoxyphenoxy)benzene; the bis(phenoxyphenoxyphenyl) ethers, e.g., bis[m - (m-phenoxyphenoxy)phenyl] ether, bis[p - (p - phenoxyphenoxy)phenyl] ether, 3 - (m - phenoxyphenoxy) - 3'- (o - phenoxyphenoxy)diphenylether and the bis(phenoxyphenoxy)benzenes, e.g., m-bis[m-(m-phenoxyphenoxy)phenoxy]benzene, p - bis[p - (m - phenoxyphenoxy)phenoxy]benzene, m - bis[m - (p - phenoxyphenoxy)phenoxy]benzene and 1,3,4-triphenoxy benzene.

Examples of substituted polyphenyl ethers are 1 - (p-methylphenoxy) - 4 - phenoxy benzene, 2,4 - diphenoxy-1-methylbenzene, bis[p - (p - methylphenoxy)phenyl] ether, bis[p - (p - tert-butylphenoxy)phenyl] ether and mixtures thereof.

Typical examples of phenoxybiphenyl compounds are 3,3' - diphenoxybiphenyl, 2,4' - diphenoxybiphenyl, 3,4'-diphenoxybiphenyl, 3,4 - diphenoxybiphenyl o-, m- and p - phenoxybiphenyl and tri- and tetra - substituted phenoxybiphenyls.

Typical examples of mixed polyphenyl ether-thioethers are 1 - phenylmercapto - 2,3-bis(phenoxy)benzene, 2 - phenylmercapto - 4' - phenoxydiphenyl sulfide, 2 - phenoxy - 3' - phenylmercaptodiphenyl sulfide, 2,2' - bis(phenylmercapto)diphenyl ether, 3,4' - bis(m - tolylmercapto) diphenyl ether, 3,3'-bis(xylylmercapto)diphenyl ether, 3,4' - bis(m - isopropylphenylmercapto)diphenyl ether, 3,4' - bis(p - tert - butylphenylmercapto)-diphenyl ether, 3,3' - bis(m - chlorophenylmercapto)diphenyl ether, 2 - (m - tolyloxy) - 2' - phenylmercaptodiphenyl sulfide, m - phenylmercaptodiphenyl ether, 3,3'-bis(phenylmercapto) - diphenyl ether, 3,3' - bis(phenoxy)-diphenyl sulfide, 3 - phenoxy - 3' - phenylmercaptodiphenyl sulfide, 3 - phenylmercapto - 3' - phenoxydiphenyl ether, 3,4' - bis(phenylmercapto)diphenyl ether, m - bis(m - phenylmercaptophenoxy)benzene, 3 - phenylmercapto - 3' - (m - phenylmercaptophenylmercapto)diphenyl ether and mixtures thereof.

Typical examples of mixed phenoxyphenylmercaptobiphenyls are o, m and p - (phenylmercapto) o, m, and p-(phenoxy)biphenyl, o, m and p - (phenylmercaptophenylmercapto) o, m and p - (phenoxyphenoxy)biphenyl and mixtures thereof.

This invention can be better understood by the following non-limiting examples.

EXAMPLE 1

To a round bottom flask equipped with reflux condenser and stirring means is charged under nitrogen 23.5 grams (0.25 mole) of phenol, 16.3 grams (0.25 mole, 86% pellet) of potassium hydroxide and 90 ml. of hexamethylphosphorotriamide. Water is stripped from the reaction flask and 14.7 grams (0.1 mole) of m - dichlorobenzene was added. The temperature is increased to 244° C. over a one-hour period and maintained at about 240° C. for a period of about 5 hours. The reaction system is then allowed to reach room temperature and the reaction product washed with 90 ml. of 1% sodium hydroxide. Gas liquid chromatography analysis confirmed the formation of 11% 3 - chlorodiphenylether and 60% m-bis(phenoxy)-benzene.

EXAMPLE 2

To a round bottom flask equipped with a reflux condenser is charged under nitrogen 47 grams (0.5 mole) of phenol and 26.2 grams (0.5 mole) of sodium hydroxide and 100 ml. of hexamethylphosphorotriamide. The temperature is increased to 240° C. and the water removed. After removal of water, 138 grams (0.42 mole) of p-(p - phenylmercaptophenylmercapto) chlorobenzene is added in 150 ml. of hexamethylphosphorotriamide. After a period of 4 hours at a temperature of 240° C., the reaction system is allowed to reach room temperature. The product is washed with a 2% sodium hydroxide solution followed by benzene and water washes. The compound, 4-(p - phenylmercaptophenylmercapto)diphenyl ether, is obtained in 90% yield.

EXAMPLE 3

Utilizing the procedure of Example 2 m-bis(m-phenoxyphenoxy)benzene is prepared in hexamethylphosphorotriamide at a temperature of about 240° C. from 3-chlorodiphenyl ether and potassium resorcinate.

EXAMPLE 4

To a pressure vessel equipped with stirrer and sampling means is charged 122.7 grams of a mixture containing 80% m - phenoxyphenol and 20% p - phenoxyphenol in 195 ml. of N - methylpyrrolidone. Water is removed from the reaction system and 44.1 grams of m-dichlorobenzene was added. The temperature is increased to 275° C. for a period of 8 hours under pressure. The temperature is allowed to reach ambient temperature and the product is washed with an aqueous sodium hydroxide solution followed by water and benzene washes. The solvent is stripped and a yield of 51% of a mixture of (phenoxyphenoxy)chlorobenzenes and bis(phenoxyphenoxy)-benzenes is obtained with the major amount being bis-(phenoxyphenoxy)benzene.

EXAMPLE 5

Utilizing the procedure of Example 5, m - dibromobenzene is reacted with phenoxyphenoxyphenol (80% meta/20% ortho) in N - methylpyrrolidone at a temperature of 250° C. for a period of 5 hours. A mixture of (phenoxyphenoxy)bromobenzenes and bis(phenoxyphenoxy)benzene is obtained in about 50% yield.

EXAMPLE 6

Utilizing the procedure of Example 5, m - dichlorobenzene is reacted with phenoxyphenol (80% meta/20% ortho) in dimethylacetamide at a temperature of 260° C. for a period of 5 hours. The product upon analysis contains (phenoxyphenoxy)chlorobenzene and bis(phenoxyphenoxy)benzene.

EXAMPLE 7

Utilizing the procedure of Example 2, m - dibromobenzene is reacted with potassium phenate in hexamethylphosphorotriamide at a temperature of 240° C. for a period of about 4 hours. The product obtained is m-bis-(phenoxy)benzene.

EXAMPLE 8

Into a round bottom flask equipped with reflux condenser and stirring means is charged 0.2 mole of phenol, 0.2 mole of sodium hydroxide and 60 ml. of tetrahydro-1,1 - dioxy thiophene. After the water is removed 0.1 mole of m - dibromobenzene is added at a temperature of 240° C. After a period of one hour 27% of m-(phenoxy)bromobenzene is obtained.

EXAMPLE 9

Utilizing the procedure of Example 2, 3,3'-dichlorodiphenyl ether (0.1 mole) is interacted with potassium phenate (0.2 mole) in hexamethylphosphorotriamide at a temperature of 260° C. for a period of about 6 hours. The product obtained is m-bis(m-phenoxyphenyl) ether.

EXAMPLE 10

Utilizing the procedure of Example 2, m-dichlorobenzene (0.1 mole) is interacted with an 80% meta/20% para mixture of phenoxyphenol (0.2 mole) in hexamethylphosphorotriamide at a temperature of 255° C. for a period of 6.5 hours. The product upon analysis is a mixture of m-bis(m-phenoxyphenoxy)benzene and m-(m- phenoxyphenoxy) (p-phenoxyphenoxy)benzene and trace amounts of m-bis(p-phenoxyphenoxy)benzene.

EXAMPLE 11

Utilizing the procedure of Example 2, 3,3'-dichlorodiphenyl sulfide (0.2 mole) is interacted with potassium phenate (0.4 mole) at a temperature of 255° C. for a period of 7 hours. The product after washing and separating is bis-m-(phenoxyphenyl) sulfide.

EXAMPLE 12

Utilizing the procedure of Example 2, m-dichlorobenzene (0.1 mole) is reacted with potassium phenate (0.25 mole) in 2-pyrrolidone at a temperature of 240° C. for a period of 22 hours. The products after washing with an aqueous solution of sodium hydroxide and water are bis-m-phenoxybenzene and 3-chlorodiphenyl ether.

EXAMPLE 13

Following the procedure of Example 2, m-dichlorobenzene (0.1 mole) is reacted with potassium phenate (0.25 mole) in benzophenone at a temperature of 280° C. for a period of 22 hours. After washing with a 1% aqueous solution followed by water washings, the product is m-phenoxybenzene.

Similar results are obtained utilizing tetrahydro-1,1-dioxy thiophene as the solvent in place of hexamethylphosphorotriamide.

As is well illustrated by Examples 1 through 8, the process of this invention is applicable to the preparation of oxygen-containing compounds in certain dipolar aprotic solvents. In particular it has been shown that oxygen-containing compounds can be prepared at high temperatures in good yields in the absence of a copper catalyst. In addition, it has been shown that resorcinol interacts at high temperatures which is contrary to the results obtained in the typical Ullmann reaction. The temperature dependence of the process of this invention is completely unpredictable from the teachings of the Ullmann reaction since the yields following the teachings of the Ullmann reaction decrease as temperatures are increased. In addition, the reactive halo atom of starting reactant (A) does not have to be activated in order to obtain displacement by, for example, a phenate ion.

The embodiments of this invention in which an exclusive property or privilege is claimed are defined as follows:

1. A process for preparing polyphenyl ethers or thioethers which consists essentially of reacting, at temperatures in the order of at least about 190° C., (A) A halo compound represented by the structure $$R(Hal)_n$$

wherein R is an aryl group selected from the class consisting of phenanthryl, phenylmercaptophenyl, phenyl, phenoxyphenyl, phenoxyphenoxyphenyl, naphthyl, biphenyl, anthryl and said groups sub-substituted with a member of the group consisting of alkyl, alkoxy, hydroxyl, haloalkyl, phenoxy, thiophenoxy, chlorine, bromine and iodine, Hal is a reactive halogen selected from the group consisting of iodine, chlorine and bromine and $n$ is a whole number having a value of from 1 to six, with the proviso that no more than 3 halogens are on the same ring, with (B) an alkali metal compound represented by the structure $$M_a\text{—}(O)_a\text{—}R_1$$

wherein M is an alkali metal, $R_1$ is an aryl group selected from the class consisting of phenyl, phenoxyphenyl, phenoxyphenoxyphenyl, diphenyl groups and said groups substituted with a member of the group consisting of alkyl, alkoxy, hydroxyl, haloalkyl, phenoxy, thiophenoxy, chlorine, bromine and iodine and $a$ is a whole number having a value of at least 1, in the presence of (C) a dipolar aprotic solvent containing up to 48 carbon atoms selected from the group consisting of secondary and tertiary amides, cyclic amides, ketones and amides of an acid of phosphorus provided that there is not more than one hydrogen atom attached to the nitrogen atom which is attached to phosphorus.

2. A process of claim 1 wherein Hal is selected from the group consisting of chlorine and bromine.

3. A process of claim 2 wherein $n$ has a value of from 1 to 4 and $a$ has a value of from 1 to 4.

4. A process of claim 2 wherein the dipolar aprotic solvent is selected from the group consisting of N,N-dialkyl alkylamide, N,N-dialkyl arylamide and cyclic amides having from 3 to 10 atoms.

5. A process of claim 2 wherein the dipolar aprotic solvent is selected from the group consisting of mono-, di- and triamides of an acid of phosphorus.

6. A process of claim 2 wherein the dipolar aprotic solvent is N,N,N',N',N'',N'' - hexaalkylphosphorotriamidate wherein each alkyl group contains 1 to 10 carbon atoms.

7. A process of claim 3 wherein R and $R_1$ each are aryl groups having from 1 to 4 carbocyclic rings selected from the group consisting of phenyl, phenylene, biphenylyl and biphenylylene optionally linked by from 0 to 4 hetero atoms selected from the group consisting of oxygen and sulfur.

8. A process of claim 7 wherein $n$ has a value of from 1 to 2 and $a$ has a value of from 1 to 2.

9. A process of claim 7 wherein the dipolar aprotic solvent is selected from the group consisting of N,N-dialkyl alkylamide, N,N-dialkyl arylamide and a cyclic amide having from 3 to 10 atoms.

10. A process of claim 7 wherein the dipolar aprotic solvent is selected from the group consisting of mono-, di- and triamides of an acid of phosphorus.

11. A process of claim 4 wherein the dipolar aprotic solvent is selected from the group consisting of an N,N-dialkyl alkylamide wherein each alkyl group contains from 1 to 12 carbon atoms and an N-alkyl carbon-containing heterocyclic compound having from 4 to 8 atoms in the ring.

12. A process of claim 7 wherein the dipolar aprotic solvent is N-alkyl-pyrrolidone wherein the alkyl group contains from 1 to 10 carbon atoms.

13. A process of claim 7 wherein the dipolar aprotic solvent is N,N,N',N',N'',N'' - hexaalkylphosphorotriamidate wherein each alkyl group contains from 1 to 10 carbon atoms.

14. A process of claim 8 wherein the carbocyclic rings are selected from the group consisting of phenyl and phenylene optionally linked by from 1 to 3 hetero atoms and (C) is N,N,N',N',N'',N''-hexaalkylphosphorotriamidate wherein each alkyl group contains from 1 to 6 carbon atoms.

References Cited

UNITED STATES PATENTS

| | | | |
|---|---|---|---|
| 3,294,846 | 12/1966 | Livak et al. | 260—613 |
| 3,422,154 | 1/1969 | Laucius et al. | 260—612 |
| 3,423,470 | 1/1969 | Rohr et al. | 260—612 |
| 3,355,272 | 11/1967 | D'Alessandro | 260—837X |

FOREIGN PATENTS

| | | | |
|---|---|---|---|
| 650,476 | 1/1965 | Belgium | 260—607 |

CHARLES B. PARKER, Primary Examiner

D. R. PHILLIPS, Assistant Examiner

U.S. Cl. X.R.

260—465, 570.9, 575, 591, 592, 611, 612, 613